United States Patent
Qian et al.

(10) Patent No.: US 10,810,347 B2
(45) Date of Patent: Oct. 20, 2020

(54) PCBA INSPECTION METHOD AND SYSTEM BASED ON 3D AOI AND AXI

(71) Applicant: Vayo (Shanghai) Technology Co., Ltd., Shanghai (CN)

(72) Inventors: Shengjie Qian, Shanghai (CN); Fengshou Liu, Shanghai (CN); Pan Su, Shanghai (CN); Zhongliang Zhu, Shanghai (CN)

(*) Notice: Subject to any disclaimer, the term of this patent is extended or adjusted under 35 U.S.C. 154(b) by 0 days.

(21) Appl. No.: 16/474,066

(22) PCT Filed: Dec. 28, 2017

(86) PCT No.: PCT/CN2017/119333
§ 371 (c)(1),
(2) Date: Jun. 27, 2019

(87) PCT Pub. No.: WO2018/121663
PCT Pub. Date: Jul. 5, 2018

(65) Prior Publication Data
US 2020/0250367 A1    Aug. 6, 2020

(30) Foreign Application Priority Data

Dec. 30, 2016    (CN) .......................... 2016 1 12576069

(51) Int. Cl.
*G06F 30/398* (2020.01)
*H05K 3/00* (2006.01)

(52) U.S. Cl.
CPC ......... *G06F 30/398* (2020.01); *H05K 3/0005* (2013.01)

(58) Field of Classification Search
CPC .............. G05B 19/4097; G05B 19/418; G05B 2219/2602; G05B 2219/45026; G06F 30/00; G06F 30/398; H05K 3/0005; H05K 3/00
See application file for complete search history.

(56) References Cited

U.S. PATENT DOCUMENTS

2015/0066180 A1*  3/2015  Qian ...................... G06F 30/00
                                                      700/98

FOREIGN PATENT DOCUMENTS

| CN | 102682166 A | 9/2012 |
| CN | 104765822 A | 7/2015 |
| CN | 106227946 A | 12/2016 |
| CN | 106777756 A | 5/2017 |

* cited by examiner

*Primary Examiner* — Vuthe Siek

(57) ABSTRACT

The present disclosure provides a PCBA detection method and a system based on 3D AOI and AXI. The method includes: preconfiguring graphical data in a part physical database; obtaining CAD data related to a PCB based on design data input from PCB design software; converting the generated CAD data, and generating 3D basic graphical data to generate a 3D physical model; extracting BOM information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model; and generating standard 3D detection prototype data, outputting the standard 3D detection prototype data to 3D AOI and AXI for detection.

8 Claims, 2 Drawing Sheets

PCBA INSPECTION METHOD AND SYSTEM BASED ON 3D AOI AND AXI

CROSS REFERENCES TO RELATED APPLICATIONS

This is a Sect. 371 National Stage of PCT International Application No. PCT/CN2017/119333, filed on 28 Dec. 2017, which claims priority of a Chinese Patent Application No. 2016112576069 filed on 30 Dec. 2016, the contents of both applications hereby being incorporated by reference in their entireties for all purposes.

BACKGROUND OF THE PRESENT DISCLOSURE

Field of Disclosure

The present disclosure relates to the field of Printed Circuit Board assembly (PCBA) detection, and in particular to a PCBA detection method and a system based on 3D automated optical inspector (AOI) and automated X-ray inspector (AXI).

Description of Related Arts

As the electronic manufacturing industry develops, existing 2D AOI no longer satisfies industry requirements, and 3D AOI and AXI emerge in recent years and are basically widely used in the industry. Main detection program production of 3D AOI and 3D AXI currently used in the market generally uses two methods: 1. a PCBA for which devices have been assembled is placed on a machine for scanning, which is used as a detection standard; and 2. a file and a bill of material (BOM) with part names and coordinates are read, and 3D model data is created for each part and a detection algorithm is set.

Disadvantages of the forgoing two methods are as follows:

First: The methods are simple 3D AOI and 3D AXI detection methods, and cannot adapt to a normal production requirement, part information and the like cannot be obtained, and detection is only a black box and cannot satisfy an industry trace standard.

Second: It takes a lot of time to program, and it occupies the programming of the machine, which greatly wastes the utilization of the machine and is obviously not suitable for the development requirements of intelligent manufacturing.

Summary of the Present Disclosure

The present disclosure provides a PCBA detection method and system based on 3D AOI and AXI, to resolve a problem that obtained detection information is incomplete and detection efficiency is low.

The present disclosure provides a PCBA detection method based on 3D AOI and AXI, including: preconfiguring graphical data in a part physical database, the graphical data includes at least part body data and pin data; obtaining CAD data related to a PCB based on design data input from PCB design software; converting the generated CAD data, and generating 3D basic graphical data to generate a 3D physical model; extracting BOM information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model; and generating standard 3D detection prototype data by combining the generated 3D physical model and the CAD data, and outputting the standard 3D detection prototype data to 3D AOI and AXI for detection.

In a specific embodiment of the present disclosure, the part physical database is searched for the matched graphical data based on key information included in the BOM information, and the key information includes one or more of the following: a part name, a specified material code, and a general-purpose material code.

In a specific embodiment of the present disclosure, generating corresponding image data based on obtained created data includes: generating the image data based on obtained created data including the length, the width, and the thickness of a part.

In a specific embodiment of the present disclosure, converting the generated CAD data, and generating 3D basic graphical data includes the following step: averaging the thickness on each PCB layer based on the thickness of a PCB sheet in the design data.

In a specific embodiment of the present disclosure, preconfiguring graphical data in a part physical database includes: extracting the graphical data from a preset existing part library; and/or creating the graphical data based on obtained package information and an obtained material code.

To achieve the foregoing objectives and other related objectives, the present disclosure further provides a PCBA detection system based on 3D AOI and AXI, including: a part 3D physical model database, which preconfigures graphical data in a part physical database, the graphical data includes at least part body data and pin data; a data input module, which configures to obtain CAD data related to a PCB based on design data input from PCB design software; a basic data conversion module, which configures to convert the generated CAD data, and generate 3D basic graphical data to generate a 3D physical model; a search module, which configures to extract BOM information from the design data, search the part physical database for matched graphical data based on the BOM information, if the matched graphical data is found, generate a 3D physical model based on the graphical data; a 3D physical model creation module, which configures to generate corresponding image data based on obtained created data, to generate a 3D physical model when the search module has not found the matched graphical data; and a 3D detection prototype data generation module, which configures to generate standard 3D detection prototype data by combining the generated 3D physical model and the CAD data, and output the standard 3D detection prototype data to 3D AOI and AXI for detection.

In a specific embodiment of the present disclosure, the part physical database is searched for the matched graphical data based on key information included in the BOM information, and the key information includes one or more of the following: a part name, a specified material code, and a general-purpose material code.

In a specific embodiment of the present disclosure, generating corresponding image data based on obtained created data by the 3D physical model creation module includes: generating the image data based on obtained created data including the length, the width, and the thickness of a part.

In a specific embodiment of the present disclosure, converting the generated CAD data and generating 3D basic graphical data by the basic data conversion module includes:

averaging the thickness on each PCB layer based on the thickness of a PCB sheet in the design data.

In a specific embodiment of the present disclosure, preconfiguring graphical data in a part physical database includes: extracting the graphical data from a preset existing part library; and/or creating the graphical data based on obtained package information and an obtained material code.

As described above, the present disclosure provides the PCBA detection method and system based on 3D AOI and AXI. The method includes: preconfiguring graphical data in a part physical database, wherein the graphical data includes at least part body data and pin data; obtaining CAD data related to a PCB based on design data input from PCB design software; converting the generated CAD data, and generating 3D basic graphical data to generate a 3D physical model; extracting BOM information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model; and generating standard 3D detection prototype data by combining the generated 3D physical model and the CAD data, and outputting the standard 3D detection prototype data to 3D AOI and AXI for detection. In the present disclosure, standard 3D detection prototype data can be conveniently and efficiently generated, and the 3D detection prototype data has relatively complete contents, so that relatively comprehensive detection can be performed.

DESCRIPTION OF REFERENCE NUMERALS

Figure 1:
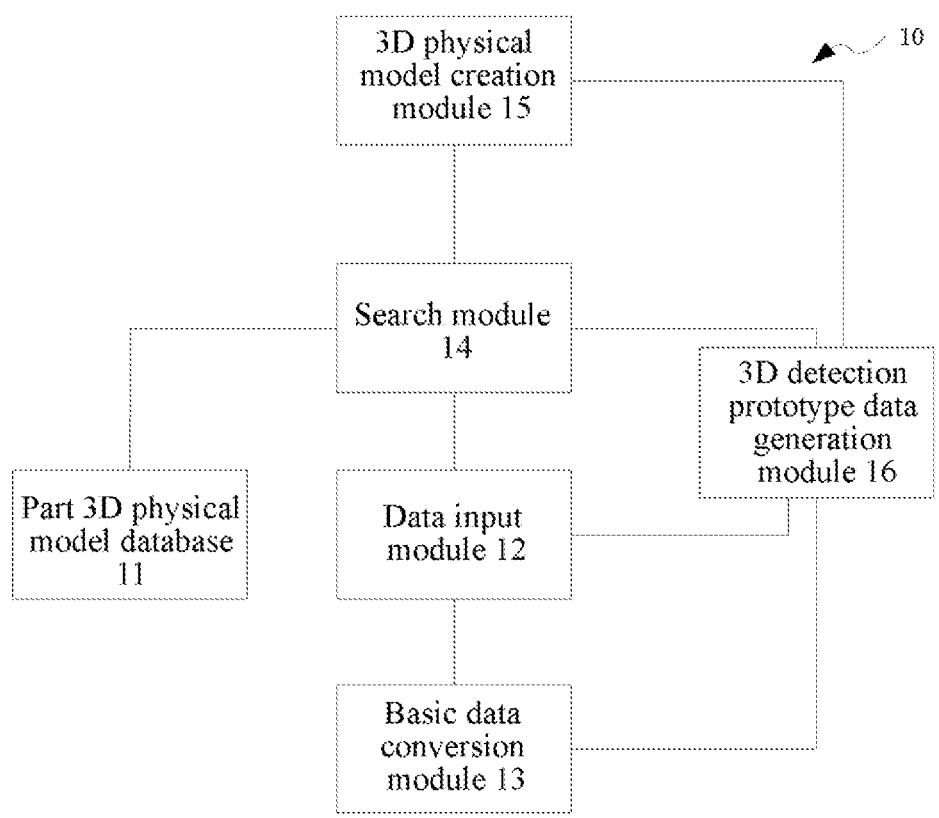
FIG. 1 is a schematic modular diagram of a PCBA detection system based on 3D AOI and AXI according to a specific embodiment of the present disclosure.

10: PCBA detection system based on 3D AOI and AXI
11: Part 3D physical model database
12: Data input module
13: Basic data conversion module
14: Search module
15: 3D physical model creation module
16: 3D detection prototype data generation module
20: PCBA detection method based on 3D AOI and AXI
21-25: Steps

DETAILED DESCRIPTION OF THE PREFERRED EMBODIMENTS

The implementation mode of the present disclosure will be described below in through specific embodiments. One skilled in the art can easily understand other advantages and effects of the present disclosure according to contents disclosed by the description. The present disclosure can also be implemented or applied through other different specific implementation modes. Various modifications or changes can also be made to all details in the description based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrate components only related to the present disclosure and are not drawn according to the numbers, shapes and sizes of components during actual implementation, the configuration, number and scale of each component during actual implementation thereof may be freely changed, and the component layout configuration thereof may be more complex.

To provide further details and completeness of descriptions of the present disclosure, refer to the accompanying drawings and the following embodiments. However, the provided embodiments are not intended to limit the scope of the present disclosure and descriptions of the steps are not intended to limit an execution sequence thereof either, and any apparatus obtained by recombination to have equivalent effects falls within the scope of the present disclosure.

In the implementations and the patent scope of this application, "a" and "the" may generally refer to one or more unless articles are particularly specified in this specification. It should be further understood that "include", "comprise", "contain", and similar terms used in this specification indicate a feature, an area, an integer, a step, an operation, an element, and/or a component described therein, but do not preclude the presence or addition of one or more other features, areas, integers, steps, operations, components, and/or groups thereof.

FIG. 1 is a schematic modular diagram of a PCBA detection system based on 3D AOI and AXI according to a specific embodiment of the present disclosure. A PCBA, that is, an assembly of PCB, specifically refers to that various electronic devices are assembled on a circuit board by using a surface package process.

The PCBA detection system 10 based on 3D AOI and AXI includes: a part 3D physical model database 11, a data input module 12, a basic data conversion module 13, a search module 14, a 3D physical model creation module 15, and a 3D detection prototype data generation module 16.

The part 3D physical model database 11 preconfigures graphical data in a part physical database, the graphical data includes at least part body data and pin data, in a specific application, the part 3D physical model database 11 is a part physical database including 3D shapes and the like, and may be used by a plurality of network users. The graphical data may come from an existing Design for Manufacturability (DFM) system part library, or a 3D physical part may be freely created based on package and a material code. The graphical data includes a part body and a pin.

The data input module 12 configures to obtain CAD data related to a PCB based on design data input from PCB design software.

The basic data conversion module 13 configures to convert the generated CAD data, and generate 3D basic graphical data to generate a 3D physical model, that is, after the design data is read, CAD 2D data for PCB design is converted to 3D graphical data for display as a 3D PCB.

The search module 14 configures to extract BOM information from the design data, search the part physical database for matched graphical data based on the BOM information, and if the matched graphical data is found, generate a 3D physical model based on the graphical data; preferably, part physical data and three-dimensional graphs are obtained from the part 3D physical model database 11 based on a material number or package in the BOM, a three-dimensional part entity is placed on two-dimensional graphical data based on part coordinates, and angle simulation placement is correspondingly performed.

The 3D physical model creation module 15 configures to generate corresponding image data based on obtained created data, to generate a 3D physical model when the search module has not found the matched graphical data; in a specific application, the part 3D physical database is drafted based on part specification descriptions or part three-dimensional data provided by a manufacturer or created based on read CAD basic data for PCB design.

The 3D detection prototype data generation module 16 configures to generate standard 3D detection prototype data by combining the generated 3D physical model and the CAD data, and output the standard 3D detection prototype data to a PCBA detection device for detection, the PCBA detection device includes a 3D AOI and AXI.

In a specific embodiment of the present disclosure, the part physical database is searched for the matched graphical data based on key information included in the BOM information, and the key information includes one or more of the following: a part name, a specified material code, and a general-purpose material code.

In a specific embodiment of the present disclosure, a manner in which the 3D physical model creation module generates corresponding image data based on obtained created data includes: generating the image data based on obtained created data including the length, the width, and the thickness of a part.

In a specific embodiment of the present disclosure, the process of converting the generated CAD data and generating 3D basic graphical data by the basic data conversion module includes: averaging the thickness on each PCB layer based on the thickness of a PCB sheet in the design data.

In a specific embodiment of the present disclosure, a manner of preconfiguring graphical data in a part physical database includes: extracting the graphical data from a preset existing part library; and/or creating the graphical data based on obtained package information and an obtained material code.

The following further describes an application process of the PCBA detection system 10 based on 3D AOI and AXI:

(1) Starting the data input module 12 to input and read a CAD file for PCB design, and converting the CAD file for PCB design to 3D basic data by using the basic data conversion module 13 and display the 3D basic data by using graphs. A method is as follows: A parameter of the thickness of a PCB sheet may be obtained from data of the CAD file for PCB design. The thickness is averaged on each PCB layer to complete 3D presentation of the PCB.

(2) Combining the BOM with a part location in the 3D basic data, that is, associating a material code in the BOM with the part location in the 3D basic data based on the part location (for example, U1) (being unique).

(3) The search module 14 searches the part 3D physical model database 11 by using a material code, material codes are the same. If there is no match, searching for a physical material having a general-purpose material code, for example, a material number ABCD. If the physical part database includes ABCD, then it can be found; if the physical part database does not include ABCD, then searching for ABC*, AB*, or A*, and it may be determined that there is a match if ABC*, AB* or A* is found. A found 3D graph is placed on the PCB to form a 3D PCBA.

(4) A part material code that is not found may be generated by using the 3D physical model creation module 15 consistent with the present disclosure. The basic data includes the length, the width, and the thickness of a part, and the size of a pin may be increased or decreased based on a proportion by using a bonding pad, until all parts on the PCB are created.

(5) The 3D detection prototype data generation module 16 generates standard 3D detection prototype data based on the existing combined data.

The following describes related part information in a specific embodiment using the PCBA detection system based on 3D AOI and AXI consistent with the present disclosure, wherein content after "//" is remarks, and the unit may be mm, mil, or the like.

[Version]
//version information
1.1.0.1
[Unit]
//unit: mm=metric system, inch=British system, mil=millmil-inch mm
[PanelInfo]
//panel size information
//corresponding Chinese: origin X coordinate, origin Y coordinate, length, width
0 198000 110000 198000
[BoardInfo]
//board information
//corresponding Chinese: board number, board origin X coordinate, board origin Y coordinate, length, width, rotation angle, belonging to the front face or the opposite face of an original board

| 1 | 21330 | 54225 | 26719 | 42980 | 0.00"T" |
| 2 | 68330 | 54225 | 26719 | 42980 | 0.00"T" |

[FDMark]
//fiducial mark information
//fiducial mark number, X coordinate, Y coordinate, size, fiducial mark shape (1: circular, 2: rectangular, 3: diamond-shaped), color, plate number (−1 indicates a panel)

| 1 | 22745 | 9058 | 1.000 | 2 | 0 | −1 |
| 2 | 91126 | 190715 | 1.000 | 2 | 0 | −1 |
| 3 | 26832 | 15382 | 1.000 | 2 | 0 | 1 |
| 4 | 74089 | 49344 | 1.000 | 2 | 0 | 2 |

[BadMark]
//bad plate fiducial mark information
//bad plate fiducial mark number, X coordinate, Y coordinate, length, width, plate number, bad plate fiducial mark image

| 1 | 42568 | 50861 | 1499 | 1499 | 1 | "C:\badimage\bad1.bmp" |
| 2 | 88619 | 14737 | 1199 | 1199 | 2 | "C:\badimage\bad1.bmp" |

[PartData]
//board part information
//part name, X coordinate relative to a board, Y coordinate, angle, front face and opposite face, library name, group type, material code, mounting attribute, board number, pin quantity
//mounting attribute is definable, PLACEMENT, UNPLACEMENT

"Q1"  34089  51685  180"T"  "SOT323_3AKM"  " "  "PNV50001"  "PLACEMENT"  1  3

//pin number (corresponding to a quantity), pin name, X coordinate, Y coordinate, angle, bonding pad length, bonding pad width, shape code

| | | | | | | |
|---|---|---|---|---|---|---|
| 1 | "A"34739 | 52735 | 0 | 599 | 799 | 0 |
| 2 | "K"33439 | 52735 | 0 | 599 | 799 | 0 |
| 3 | "M"34089 | 50634 | 0 | 599 | 799 | 0 |
| "Q2" | 34089 | 46605 | 90"T" "SOT323_3AKM" " " "PNV50001" "PLACEMENT" 1 3 | | | |
| 1 | "A"35139 | 45955 | 0 | 799 | 599 | 0 |
| 2 | "K"35139 | 47254 | 0 | 799 | 599 | 0 |
| 3 | "M"33039 | 46605 | 0 | 799 | 599 | 0 |

[Library]
//part library information
//library mark start keyword, library name, reserved vender name, reserved vender material number, material code LIBRARY  "SOT323_3AKM"  "No_Part"  "No_Vender"  "PNV50001"

//library mark body keyword, number, height, whether there is a polarity, shape code (0: rectangular 1: circular 2: polygonal)

BODY  1  900  0  2

//shape code coordinate information: 0 represents rectangle only has the length and the width, 1 represents a circle only has the diameter, and 2 represents n coordinates of polygons

| | |
|---|---|
| −1050 | −620 |
| 1050 | −620 |
| 1050 | 620 |
| −1050 | 620 |
| −1050 | −620 |

//library mark pin keyword, pin number, pin name, pin thickness, shape code, pin location, 0: front segment, 1: rear segment, 2: entire segment

| | | | | | |
|---|---|---|---|---|---|
| PIN 1 | "1" | 1000 | 0 | 2 | 0 |

//shape code coordinate information: 0 a represents rectangle only has the length and the width, 1 represents a circle only has the diameter, and 2 represents n coordinates of polygons

| | | | | | |
|---|---|---|---|---|---|
| −475 | −670 | | | | |
| −825 | −669 | | | | |
| −825 | −1050 | | | | |
| −475 | −1050 | | | | |
| −475 | −670 | | | | |
| PIN 2 | "2" | 1000 | 0 | 2 | 0 |
| 825-670 | | | | | |
| 475-669 | | | | | |
| 475-1050 | | | | | |
| 825-1050 | | | | | |
| 825-670 | | | | | |
| PIN 3 | "3" | 1000 | 0 | 2 | 0 |
| −175 670 | | | | | |
| 175670 | | | | | |
| 1751050 | | | | | |
| −175 1050 | | | | | |
| −175 670 | | | | | |

Compared with the existing solution in the industry, implementation of the present disclosure can change the existing conventional practice, improve machine utilization, and reduce the programming time. In addition, product trace satisfies industry manufacturing requirements. Details are shown in Table 1:

TABLE 1

Economic benefit calculation table

| Item description | Value | Remarks |
|---|---|---|
| Total quantity of AOIs and AXIs per day | 4 | One factory |
| Production days per year (day) | 245 | 52 weeks × 5 days per week − holidays |
| AOI engineer costs (RMB/month/person) | 5000 | The wage is RMB 5000, that is, current average industry wage |
| Previous programming time (hour/unit) | 4 | |
| Current programming time (hour/unit) | 2 | |
| Time saved (hour) | 8 | 4 × 2 hours, that is, half the time can be saved |
| Personnel costs saved per day (RMB) | 227.3 | The wage is 5000, each month has 22 days, and labor cost for each hour is 5000/22/8 * 8 |
| Personnel costs saved per year (RMB) | RMB 55,682 | |
| Device occupation time that can be reduced per day (hour) | 1 | Device cost is RMB 100,000, and a device service life is 10 years |

TABLE 1-continued

Economic benefit calculation table

| Item description | Value | Remarks |
| --- | --- | --- |
| Quantity (piece) of PCBs that can be additionally tested by a device | 180 | Test time of a PCB is 20 seconds |
| Expenses saved per year (RMB) | RMB 2205 | 0.05 × 180 × 245, that is, test cost is RMB 0.05 per piece |
| Total expenses directly saved per year (RMB) | RMB 57,887 | |
| Profits of accelerating launch of new products cannot be estimated | ∞ | |

Figure 2:
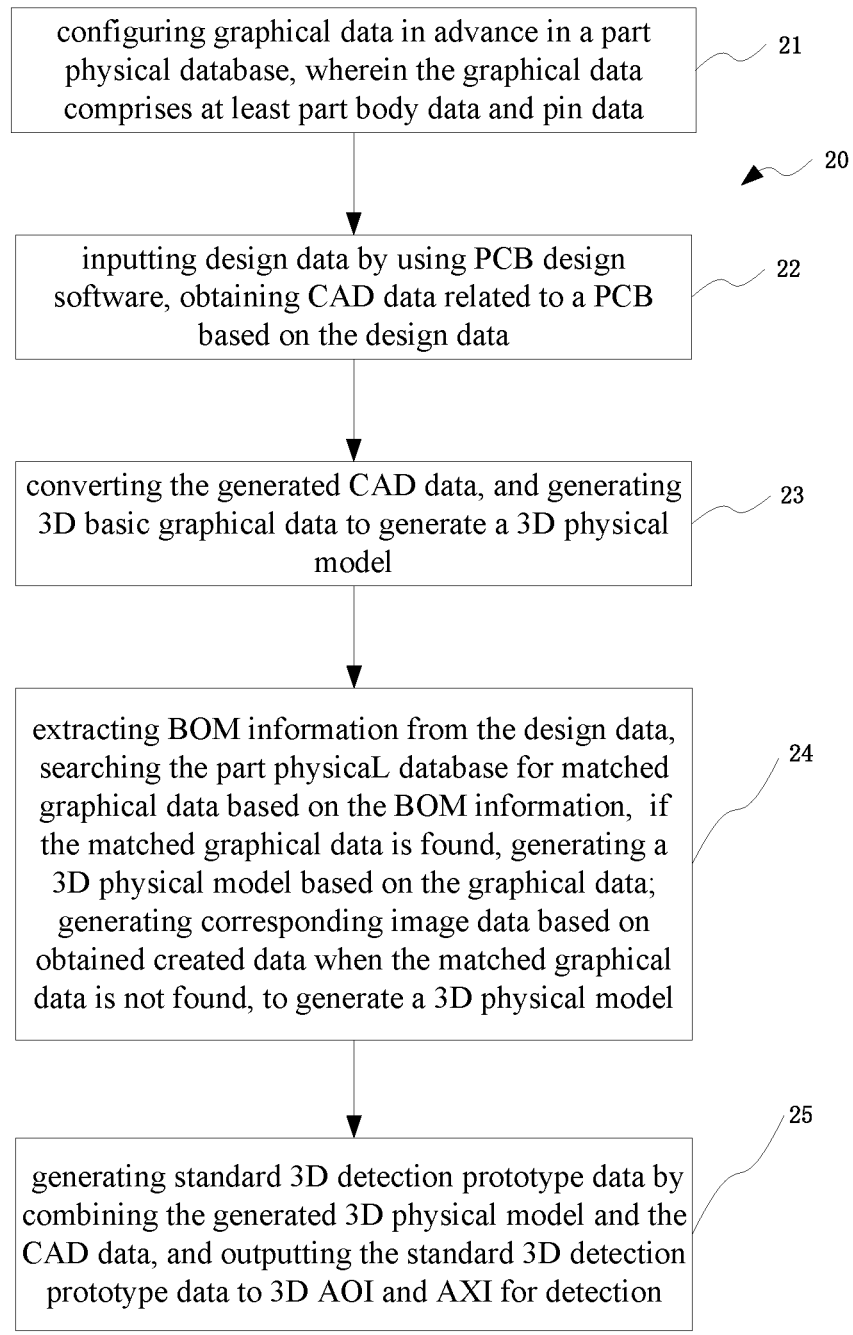
FIG. 2 is a schematic flowchart of a PCBA detection method based on 3D AOI and AXI according to a specific embodiment of the present disclosure.

FIG. 2 is a schematic flowchart of a PCBA detection method based on 3D AOI and AXI according to a specific embodiment of the present disclosure. The PCBA detection method 20 based on 3D AOI and AXI includes: 21: Preconfiguring graphical data in a part physical database, the graphical data includes at least part body data and pin data. 22: Obtaining CAD data related to a PCB based on design data input from PCB design software. 23: Converting the generated CAD data, and generating 3D basic graphical data to generate a 3D physical model. 24: Extracting BOM information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model. 25: Generating standard 3D detection prototype data by combining the generated 3D physical model and the CAD data, and outputting the standard 3D detection prototype data to 3D AOI and AXI for detection.

In a specific embodiment of the present disclosure, the part physical database is searched for the matched graphical data based on key information included in the BOM information, and the key information includes one or more of the following: a part name, a specified material code, and a general-purpose material code.

In a specific embodiment of the present disclosure, the step of generating corresponding image data based on obtained created data includes: generating the image data based on obtained created data including the length, the width, and the thickness of a part.

In a specific embodiment of the present disclosure, the process of converting the generated CAD data, and generating 3D basic graphical data includes the following step: averaging the thickness on each PCB layer based on the thickness of a PCB sheet in the design data.

In a specific embodiment of the present disclosure, a manner of preconfiguring graphical data in a part physical database includes: extracting the graphical data from a preset existing part library; and/or creating the graphical data based on obtained package information and an obtained material code.

The technical solution of the PCBA detection method 20 based on 3D AOI and AXI corresponds to the PCBA detection system 10 based on 3D AOI and AXI, and all descriptions about the PCBA detection system 10 based on 3D AOI and AXI may be applied to this embodiment.

The following describes a procedure using the PCBA detection method 20 based on 3D AOI and AXI consistent with the present disclosure:

(1) Extracting PCB CAD data generated by PCB design software into software, data content may be data conforming to the IPC-2581 industry standard, data conforming to the ODB++ standard, and the like, a PCB file drawn by PCB wiring software is converted and stretched based on the height of a PCB in the file, and 3D basic data and graphs are displayed.

(2) Extracting BOM information from design data, the BOM information includes a vender and a vender material number, or reading a BOM file including a vender, a vender material number, a material code, and a part name.

(3) Using the part name as an associated keyword in a BOM, and combining 3D data, the vender, the vender material number, and material code information in a part 3D physical model library to the 3D basic data.

(4) For a material code having no part 3D physical model, a similar 3D part entity may be manually generated based on a ponding pad and a part outer frame in CAD basic data, and the similar 3D part entity may be combined to the 3D basic data (PCB 3D circuit board).

(5) Until all parts have part 3D physical models.

(6) Combining the CAD basic data with the part 3D physical model. In this case, a complete 3D PCBA model is formed.

(7) Outputting the 3D PCBA model as 3D AOI and AXI detection program standard content.

(8) 3D AOI and 3D AXI detection device may read the data, and quickly perform detection of PCBA.

In conclusion, the present disclosure provides the PCBA detection method and system based on 3D AOI and AXI. The method includes: preconfiguring graphical data in a part physical database, the graphical data includes at least part body data and pin data; obtaining CAD data related to a PCB based on design data input from PCB design software; converting the generated CAD data, and generating 3D basic graphical data to generate a 3D physical model; extracting BOM information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model; and generating standard 3D detection prototype data by combining the generated 3D physical model and the CAD data, and outputting the standard 3D detection prototype data to 3D AOI and AXI for detection. In the present disclosure, standard 3D detection prototype data can be conveniently and efficiently generated, and the 3D detection prototype data has relatively complete contents, so that relatively comprehensive detection can be performed. Therefore, the present disclosure effectively overcomes the disadvantages in the prior art and has high industry utilization values.

The above-mentioned embodiments are just used for exemplarily describing the principle and effects of the present disclosure instead of limiting the present disclosure. One skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A PCBA detection method based on 3D automated optical inspector (AOI) and automated X-ray inspector (AXI), comprising:
    configuring graphical data in advance in a part physical database, wherein the graphical data comprises at least part body data and pin data;
    inputting design data by using PCB design software, obtaining CAD data related to a PCB based on the design data;
    converting the generated CAD data, and generating 3D basic graphical data to generate a 3D physical model;
    extracting bill of material (BOM) information from the design data, searching the part physical database for matched graphical data based on the BOM information, if the matched graphical data is found, generating a 3D physical model based on the graphical data; if the matched graphical data is not found, generating corresponding image data based on obtained created data, to generate a 3D physical model; and
    generating standard 3D detection prototype data by combining the generated 3D physical model and the CAD data, and outputting the standard 3D detection prototype data to 3D AOI and AXI for detection of the PCBA;
    wherein converting the generated CAD data and generating 3D basic graphical data by the basic data conversion module comprises:
    averaging the thickness on each PCB layer based on the thickness of a PCB sheet in the design data.

2. The PCBA detection method based on 3D AOI and AXI as in claim 1, wherein the part physical database is searched for the matched graphical data based on key information comprised in the BOM information; wherein the key information comprises one or more of the following: a part name, a specified material code, and a general-purpose material code.

3. The PCBA detection method based on 3D AOI and AXI as in claim 1, wherein generating corresponding image data based on obtained created data comprises: generating the image data based on obtained created data comprising the length, the width, and the thickness of a part.

4. The PCBA detection method based on 3D AOI and AXI as in claim 1, wherein configuring graphical data in a part physical database comprises: extracting the graphical data from a preset existing part library; and/or creating the graphical data based on obtained package information and an obtained material code.

5. A PCBA detection system based on 3D automated optical inspector (AOI) and automated X-ray inspector (AXI), comprising:
    a part 3D physical model database, configured to configure graphical data in advance in a part physical database, wherein the graphical data comprises at least part body data and pin data;
    a data input module, configured to input design data by using PCB design software, and obtain CAD data related to a PCB based on the design data;
    a basic data conversion module, configured to convert the generated CAD data, and generate 3D basic graphical data to generate a 3D physical model;
    a search module, configured to extract bill of material (BOM) information from the design data, search the part physical database for matched graphical data based on the BOM information, if the matched graphical data is found, generate a 3D physical model based on the graphical data;
    a 3D physical model creation module, configured to generate corresponding image data based on obtained created data, to generate a 3D physical model when the search module has not found the matched graphical data; and
    a 3D detection prototype data generation module, configured to generate standard 3D detection prototype data by combining the generated 3D physical model and the CAD data, and output the standard 3D detection prototype data to 3D AOI and AXI for detection of the PCBA;
    wherein converting the generated CAD data and generating 3D basic graphical data by the basic data conversion module comprises:
    averaging the thickness on each PCB layer based on the thickness of a PCB sheet in the design data.

6. The PCBA detection system based on 3D AOI and AXI as in claim 5, wherein the part physical database is searched for the matched graphical data based on key information comprised in the BOM information; wherein the key information comprises one or more of the following: a part name, a specified material code, and a general-purpose material code.

7. The PCBA detection system based on 3D AOI and AXI as in claim 5, wherein generating corresponding image data based on obtained created data by the 3D physical model creation module comprises: generating the image data based on obtained created data comprising the length, the width, and the thickness of a part.

8. The PCBA detection system based on 3D AOI and AXI as in claim 5, wherein configuring graphical data in advance in a part physical database comprises: extracting the graphical data from a preset existing part library; and/or creating the graphical data based on obtained package information and an obtained material code.

* * * * *